Nov. 4, 1958
A. D. BENTLEY
2,859,385
VISUAL DISPLAY APPARATUS
Filed Aug. 20, 1956
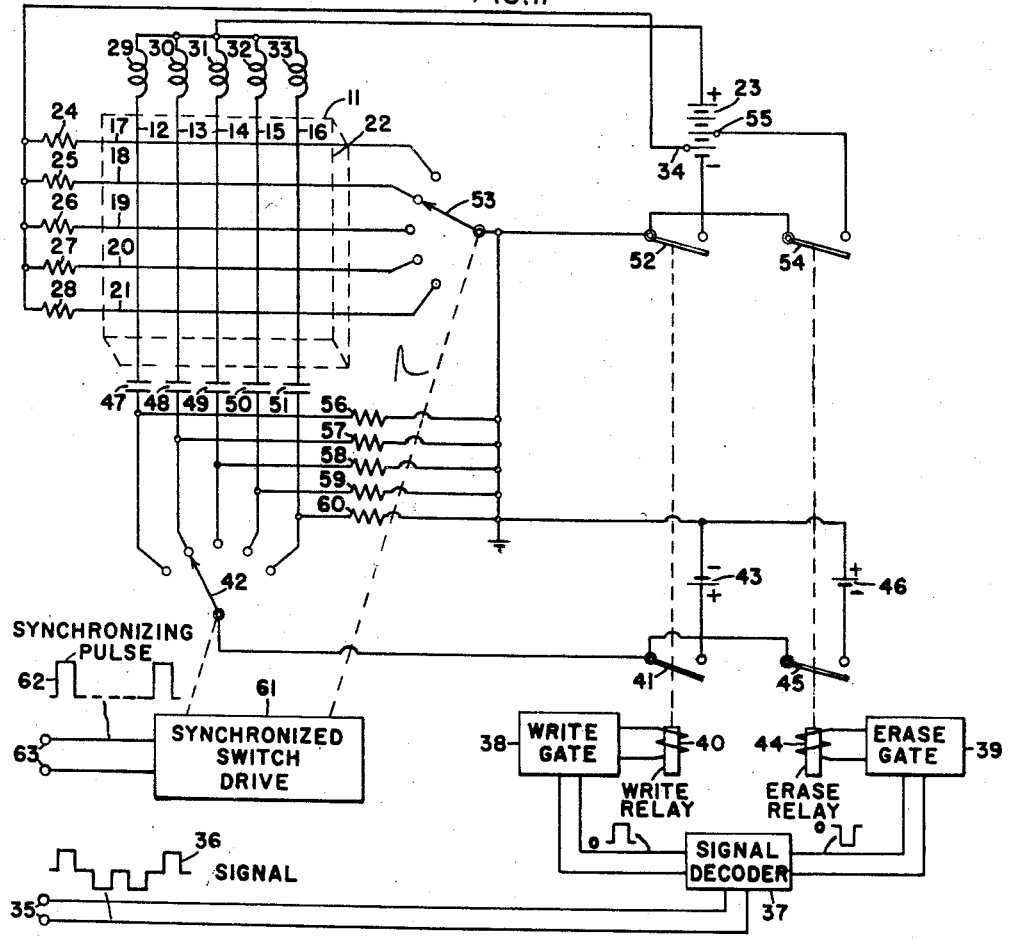
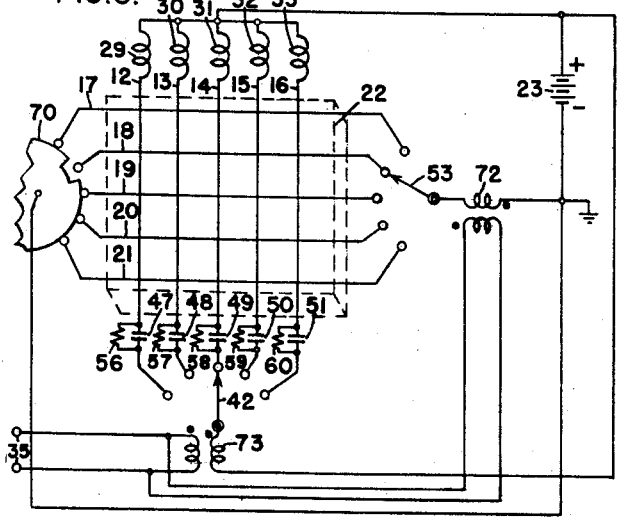
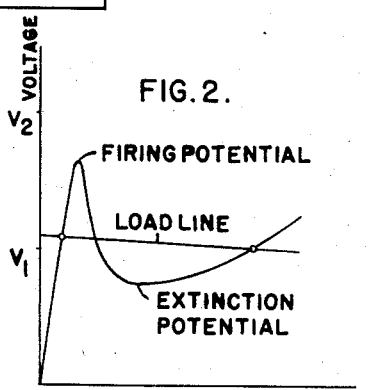
INVENTOR:
ALBERT D. BENTLEY,
BY *Robert J. Steinmeyer*
HIS ATTORNEY.

United States Patent Office 2,859,385
Patented Nov. 4, 1958

2,859,385

VISUAL DISPLAY APPARATUS

Albert D. Bentley, Schenectady, N. Y., assignor to General Electric Company, a corporation of New York Application August 20, 1956, Serial No. 605,067

9 Claims. (Cl. 315—169)

The present invention relates to visual display apparatus and more particularly to visual display apparatus of the type comprising a matrix of gaseous discharge elements.

Gaseous discharge devices which have been used for display purposes have hitherto been used to indicate an existing condition, rather than for storage of information from a previous condition. When an indication of a previous condition was desird in such a system, the storage of information was achieved in another portion of the system, which then connected or disconnected the gaseous elements with a source of firing potentials. An object of the present invention is to eliminate the necessity for such additional storage equipment, and to employ the intrinsic properties of such gaseous devices to perform both the visual display function and the storage function.

There are many applications for devices of this type. One such application is in the visual display of radar information. As is well known, the present method of radar display is to periodically sweep a slow decay phosphor with the electron beam carrying the information derived from a radar receiver. As the electron beam sweeps over the phosphor, a glow is initiated which immediately commences to decay. By the time that the beam is about to return over the same portion, the phosphor has faded. At any instant, the radar picture has a bright portion gradually fading into darkness. The problem of non-uniformity of illumination can not be cured by extending the decay period of the phosphor. Any increase in this decay period causes a diminution of accuracy in the depiction of motion. Fast moving objects, with a slow decay phosphor, would appear blurred or stretched out, and if the period of observation is short relative to the decay period, one could not tell whether the observed object was as long as the indicated line, or under certain conditions where it was located on the blurred response at any given time.

The present invention provides a cure to these defects in the visual presentation of information such as radar information. A method of presentation is here treated by which the storage of information is of long duration, if desired, or of short duration if desired. The duration of the storage is entirely controlled by the existence of new information to change the information earlier supplied. In the case of the display of stationary objects, one may scan once over the field of the display device, and the information will remain on display until another check is desired. There is no diminution in the intensity of the display by the period of time it has continued, nor is there any appreciable lag time in the depiction of motion. In the case of a rapidly moving target, each bit of information is immediately recorded, at the same time changing any information which is no longer correct. The duration of storage in such cases can be made very short, being principally limited by the amount of time that it takes for the sweep to return to the same portion of the display screen.

Accordingly, it is an object of the present invention to provide a visual display apparatus of the type adapted to receive information and to store such information in a visual display until the information is no longer desired, or the information is changed.

It is a further object of the present invention to provide a visual display apparatus employing a matrix of gaseous discharge elements adapted to store information supplied thereto while at the same time providing a meaningful display thereof.

These and other objects are achieved, in accordance with the present invention by the combination of a visual display matrix of gaseous discharge elements each having a pair of electrodes, means for supplying direct potentials to each pair of electrodes of said matrix through a path having a low direct current impedance at a voltage intermediate between the normal firing and extinction potentials of said discharge elements, and means for momentarily altering the potential between the first and second electrodes of selected elements beyond the range between said normal firing and extinction potentials in accordance with a desired signal to effect a change in condition in said elements in accordance with the information contained in said signal.

The features of the invention which are believed to be novel are set forth with particularity in the appended claims. The invention itself, both as to its organization and method of operation, together with further objects and advantages thereof may best be understood by reference to the following description when taken in connection with the following drawings, wherein:

Figure 1 illustrates a first embodiment of the invention;

Figure 2 is a graph explanatory of the invention; and

Figure 3 illustrates a second embodiment of the invention.

A practical embodiment of applicant's invention is illustrated in Figure 1. The visual display apparatus includes the visual display device 11, associated circuitry adapted to achieve operation of the visual display device as a storage device, and associated circuitry adapted to scan an applied signal over the visual display device.

The visual display device 11 provides a 5 x 5 matrix of gas discharge elements adapted to be in either fired or unfired condition. The electrodes for the discharge elements are formed from two groups of parallel wires, the first gorup of wires 12, 13, 14, 15 and 16, extending in a vertical direction on the drawing, and lying in a first plane and the second group of wires 17, 18, 19, 20 and 21, extending in the horizontal direction on the drawing, and lying in a second plane parallel to the first plane and spaced therefrom. The wires of one group of wires are orthogonally related with respect to the wires of the other group, support to the respective groups of wires and leadout terminals being provided at paired opposite edge surfaces of the relatively thin planar envelope 22 surrounding the respective groups of wires. The envelope 22 is filled with an ionizable gas at reduced pressure.

The orthogonal relationship of the respective wires, as illustrated, provides a rectangular matrix of electrode pairs, the electrodes effectively occurring at the points of closest approach between the respective wires of the respective groups. Upon elevation of the potential difference between any orthogonally related pair of wires, the strongest electrical fields are developed in the region of closest approach between these pairs of wires, and hence an arc tends to occur in that region. Confinement of the arc to the narrow region along the wires in the proximity of an intersection is achieved by proper design, including control of the inter-wire spacing, wire diameter, inter-group spacing, nature of the ionizable gaseous medium and composition of the wires. In certain arrangements a non-conductive light barrier surrounding each element may be employed. A cell having the following physical characteristics was found to exhibit favorable properties, though these are not represented to be the optimum physical characteristics. The electrodes were formed of 0.005" diameter clean nickel, spaced apart 0.2" in a gaseous mixture of argon at 7 mm. in the presence of mercury vapor. The cell exhibited a firing potential of 400 volts, and an extinction potential of 250 volts. Under fired condition the cell conducts 750 microamperes at a voltage of 300 volts. If activated nickel is employed, much lower operating potentials may be employed.

The storage circuitry associated with the display device 11 comprises a source of bias potentials 23, isolating resistances 24, 25, 26, 27 and 28, and isolating inductances 29, 30, 31, 32 and 33. The positive terminal of the source 23 is coupled respectively through isolating inductances 29 through 33 to the upper terminals of the vertical wires 12 through 16. The direct current resistances of these inductances is relatively small but their reactances are chosen to be relatively high with respect to short duration pulses. A first tap 34 on the battery 23, in proximity to the negative terminal, is coupled respectively through the isolating resistances 24 through 28 to the horizontal lines 17 through 21. The portion of the source 23 included between the positive terminal and the tap 34 constitutes a holding voltage, and has a magnitude which is intermediate between the firing potential of the individual electrode pairs and the extinction potential of the electrode pairs. The use of the isolating resistances 24 through 28 and the isolating inductances 29 through 33 permits one to modify the potentials of individual wires in accordance with an applied signal without substantial effect upon the other wires or without substantial loading effect upon the wires by the relatively low impedance of the source 23. In effecting isolation, the resistances 24 through 28 provide both A. C. and D. C. isolation, whereas the inductances 29 through 33 provide principally A. C. isolation.

The signal circuits selectively control the condition of the elements in the matrice in accordance with the signal, and synchronize the display on the matrix in time with the transmitted signal. The input terminals 35 of the display device are connected to a source (not shown) containing positive going and negative going rectangular pulses making up a signal of the nature illustrated at 36. The positive and negative going pulses coupled to the terminals 35 are then applied to a signal decoder 37 adapted to separate the positive pulses from the negative pulses and to apply the positive pulses to the write gate 38 and to apply the negative going pulses to an erase gate 39.

The signal decoder 37 may take several well known forms. One such form comprises a pair of diodes and a common conductor joining one input terminal and one of each pair of output terminals of the signal decoder. Two dissimilar terminals of the diodes are joined at the other input terminal of the decoder, and the remaining diode terminals are connected separately to each of the other decoder output terminals. The diode coupled to the decoder output terminal for the write gate 38 is poled for easy flow of positive going pulses and the diode coupled to the decoder output terminal for the erase gate is poled for easy flow of negative going pulses, thus effectively separating the positive and negative pulses and delivering them to the appropriate gates.

The write gate 38 likewise may take several well known forms. One such form is that of a triode vacuum tube, normally biased for non-conduction and adapted to become conductive in the presence of a positive pulse applied to the grid. The erase gate 39 obtains pulses of negative polarity. This requires that the pulse either be applied to the cathode or that its phase be inverted if one wishes to cause conduction of a triode normally biased for non-conduction. The latter method is usually preferable, and in that event the erase gate 39 would include both a triode responsive to positive pulses and a phase inverter for converting the negative pulses available from the decoder 37 into positive pulses.

The write gate 38 has its output terminals coupled to the operating winding of a write relay 40. The write relay 40 is a normally open double pole single throw switch. A first pole 41 of the write relay 40 is coupled to the selector arm of the vertical wire selector switch 42. The contact of the write relay 40 with which the pole 41 is adapted to make contact is connected to the positive terminal of a source of potential 43. The other terminal of the source 43 is grounded. The erase relay 44 is also a normally open double pole single throw switch having its operating winding coupled to the erase gate 39. The first pole 45 of the erase relay is joined to the pole 41 of the write relay. The contact with which the pole 45 is adapted to make contact is connected to the negative terminal of a source of direct potentials 46, whose positive terminal is connected to ground. The vertical wire selector switch 42 is a five contact switch, having these contacts connected respectively through capacitors 47, 48, 49, 50 and 51 to the lower terminals of wires 12 through 16. Capacitor discharging resistors 56, 57, 58, 59 and 60 are coupled respectively to the terminals of capacitors 47 through 51 coupled to the contacts on selector switch 42. The other terminals of these resistors are connected to ground. Accordingly, when a particular vertical wire is selected by the switch 42, and a signal is applied to either the write relay 40 or the erase relay 44, the potential of the selected wire is elevated or depressed momentarily by connection of the source 43 or 46 through the series capacitor to that wire. When the selector arm has passed a particular capacitor, that capacitor is discharged through its associated resistance, and is in discharged condition when the selector arm returns.

The application of a signal controlled voltage to the horizontal wires 17 through 21 is achieved by a method similar to that used with respect to the vertical wires. The second pole 52 of the write relay is connected to the selector arm of a horizontal wire selector switch 53. The terminal of the write relay 40 adapted to be contacted by the pole 52 is connected to the negative terminal of the source 23. The second pole 54 of the erase relay is connected to the pole 52 of the write relay. The contact of the erase relay adapted to be contacted by the pole 54 is connected to a second tap 55 on the source 23. The tap 55 is at a more positive potential than the tap 34 from which the holding voltage is derived. Selection of a particular horizontal wire for connection through the write or erase relay to an appropriate potential for writing or erasing is achieved by the five contact selector switch 53, whose contacts are connected respectively to the horizontal wires 17 through 21.

When a write or erase signal is received, the second poles (52, 54) of the write or erase relay are then operated. These relays connect the horizontal wire selected by the selector switch 53 either to a more negative potential than the voltage already supplied to the wire by the holding circuit for a write signal, or to a less negative potential than the voltage already supplied to the wire by the holding circuit for an erase signal. The presence of the isolating resistances 24 through 28 permits such depression or elevation of the potential at a selected horizontal wire without adversely effecting the holding potentials established on the other horizontal wires or unduly loading down the holding voltage source.

The synchronizing portion of the circuit performs the function of delivering the signal information to the desired portion of the display device. In the illustrated arrangement, this function is provided by the synchronized switch drive 61. The synchronized drive 61 is coupled to a source of synchronizing information, this source providing synchronizing pulses such as those illustrated at 62. The synchronizing pulses are shown as being separately available from the signal pulses, and are applied to the input terminals 63 of the synchronized switch drive 61. The synchronized switch drive 61 is mechanically coupled to the vertical wire selector switch 42 and to the horizontal wire selector switch 53. The switch drive 61 may take any of several conventional forms. One such form is that of a stepping relay adapted to advance the selector switch 42 to the next contact in response to each pulse applied to its operating winding. The synchronized switch drive 61 also includes means for advancing the selector switch 53 each time that the selector switch 42 has been operated through all of its contacts. This can be achieved by a number of lost motion devices well-known in the mechanical arts. In this manner, the selector switches in succession apply the signal to all of the intersections made with the first horizontal wire by successive vertical wires, and then successively to each of the intersections made with the second horizontal wire by the vertical wires, and so forth until all of the intersections upon the matrix have been connected.

In order to eliminate row and column ambiguity, it is usually preferable to use a synchronizing pulse which signals the commencement of each frame. If a pulse occurring only once each frame is supplied, the switch drive 61 should also include a pulse multiplier adapted to deliver twenty five stepping pulses (when a 5 x 5 matrix is employed) to the stepping relay for each such synchronizing pulse.

It should be understood that the measures previously suggested for scanning the signal over the raster, are particularly adapted to relatively low speed operation. If operation at higher speeds is desired, the selector switches 42 and 53 may be replaced by vacuum tube or transistor ring counters, and the relays 40 and 44 by magnetic core members or vacuum tube switches. Similarly the synchronizing circuits may take the form used in television receivers for synchronizing the video signal presentation with the video transmission. In such event the synchronizing information might be of the type employed in television transmission.

In the foregoing discussion, the basic methods of applying a signal synchronized in time upon a visual display device and periodically scanned over this display device have been discussed. Applicant has not, however, dealt at any length with the aspect of the invention by which information once applied to the display device is stored there until new information is received to change the condition of individual elements of the display device. The manner in which storage is achieved may be more fully understood by reference to Figure 2 illustrating the conduction properties and individual gas discharge element when subjected to increasing electrical potentials. A suitable element is one being filled with a gas which is a mixture of mercury vapor and argon at a pressure of several millimeters of mercury. The conduction is very small when an initially low, but increasing potential is applied to the element. This condition continues until one reaches a breakdown point which is termed the arcing or firing potential. At this point, an increase in current is achieved although the potential is being reduced, thus indicating the presence of a negative resistance region. The negative resistance region continues until one reaches a given current value after which the resistance becomes positive. The point of zero resistance furnishes the boundary between the negative resistance region and the commencement of the saturation region, and the potential of this point is the extinction potential of the arc. Reduction of the potential below this point consequently, will extinguish the arc and the gas discharge element will return to the initial steep portion of the conduction curve. The magnitude of the firing potential and of the extinction potential are principally controlled by the electrode spacing, electrode diameter, the density of the gas, the number of ions normally present therein, and the nature of the metal of the electrodes. The N-shaped conduction characteristic so described is a rather common phenomenon in gaseous discharge devices. If one desires other firing or arcing potentials or variation in the cell currents in a given physical configuration, a large measure of control can be achieved by the selection of several known gases or gas mixtures and by adjustment of the pressure.

In accordance with applicant's invention, these properties of a gas discharge device are utilized for visually displaying and storing information. The significant aspect of these properties is that once a potential is applied in excess of the firing potential and firing has occurred, the gas cell will remain in fired condition giving a visual indication thereof until the potential is reduced below the extinction potential. Accordingly, a holding voltage is supplied to the electrode pairs of a gas cell having a value intermediate between that of the arcing potential and that of the extinction potential. This voltage is derived from the positive terminal and tap 34 of source 23. The effect of this voltage is to continue the cell in fired condition, when a gas discharge element has been fired.

Firing and extinction of the gas discharge elements is achieved by the write and erase relays 40 and 44 and the sources coupled thereto. The firing potential is provided by the write relay 40 which simultaneously couples a potential to the selected vertical wire from the source 43 and to the selected horizontal wire from the source 23. It may be noted that each of these potentials cooperate to increase the net potential at the selected electrode pair. The sum of these two potentials and the holding potential is chosen to exceed the firing potential, and thus bring about firing of a gas discharge element.

Erasure of the stored information is provided in a similar manner, the erase relay 44 connecting the source 46 to a selected vertical wire and the tap 55 of source 23 to a selected horizontal wire. The polarities supplied by these two sources add together to reduce the potential differences between the selected electrode pair below the extinction potential and thus extinguish any arc existing at the electrode pair.

Storage of the visual information is realized by the provision of the holding voltage supplied through a low impedance path from the source 23. The provision of such a low impedance is necessary to retain the storage function. Without specification of the impedance in the supply connections, it may be noted that as the selector switches pass from an electrode pair in fired condition, that electrode pair must be maintained at a potential in excess of the extinction potential. Likewise, when the selector switches pass from an electrode pair in extinguished condition, that electrode pair must be maintained at a holding potential, not exceeding the firing potential. Since there is a substantial change in the resistance between a fired and an unfired electrode pair, it is essential that the holding voltage be supplied by a source of low internal resistance or good voltage regulation. The stability required is that the holding voltage as measured at any of the non-selected electrode pairs remain less than the firing potential and greater than the extinction potential whether any, all, or none of the electrode pairs are in fired condition.

The load line indicated in Figure 2 illustrates a preferred low value of supply source resistance. The rather small resistance indicated by the slight slope of the load line is contained in the resistances 24 through 28 required for horizontal line isolation. This isolation, as described above, is required so that individual horizontal lines may be elevated or depressed in potential to the amount necessary to affect a change in condition without also raising or lowering the potentials of the adjoining wires enough to cause a change in condition.

There are two principal considerations which require that this resistance be as low as possible. A first and perhaps, primary consideration is that dictated by the operating characteristics of the individual cells. The load line of the individual cell must intercept the initial portion of the conductivity curve below the firing potential and also intersect the conductivity curve at a point beyond the firing potential.

The above requirement, framed without reference to multiple cell matrices, permits a rather wide range in the values of the slope of the load line and in the value of the voltage at the intercept between the load line and the voltage axis. When multiple cell matrices are employed, the low slope must also be chosen so as to avoid ambiguity when cells are connected in parallel. The effect of using a larger number of cells is to require that the resistance of the isolating resistances be smaller. This follows from the fact that if one desires the potential at a selected wire to lie within a fixed range of voltages as all the cells are turned off or on, that the greater the number of such cells, the greater the change in current passing through the wire, and the greater the voltage drop in the resistance feeding that wire. This last consideration dictates that the resistance be chosen as small as possible to provide the necessary isolation between wires, and with a given kind of gas element limits the number of elements along such a wire.

A second and somewhat less stringent requirement that the slope be low is dictated by power consumption considerations. As one may observe, cells which are fired draw rather large amounts of current with respect to those cells which are unfired. When large matrices are employed, and the fired cells become numerous, a rather large amount of power is required to maintain all of the cells in fired condition. One can minimize the losses, by making power dissipation outside the individual cells as small as possible. This is accomplished by using low source and supply line resistances.

As indicated above with respect to the second consideration requiring that the slope of the load line be small, a given load line resistance limits the number of elements which can be paralleled on a given horizontal line. This consideration with respect to the embodiment shown in Figure 1 can be avoided in matrices having a larger number of elements by the arrangement shown in Figure 3. Figure 3 also shows a simplified method of controlling the matrix in response to signal pulses to achieve a stored display. Wherever possible in the numbering of the embodiment shown in Figure 3, reference numerals first used in describing the first embodiment have been repeated to indicate similar components.

The arrangement shown in Figure 3 illustrates a modification in switching technique adapting the system to be used with a large number of horizontal elements, and also a modification in the manner of applying a signal voltage to the matrix. The holding potential is supplied from the source 23, the positive terminal of which is applied to the terminals of inductors 29, 30, 31, 32 and 33, the latter being coupled respectively to the upper terminals of the vertical wires 12 through 16. The negative terminal of the holding voltage is applied to the arm of a segment switch 70. The segment switch 70 is adapted to make simultaneous contact with all of the vertical wires 17 through 21 while omitting one vertical wire in each position. The segment switch 70 has its contacts coupled to the horizontal wires 17, 18, 19, 20 and 21, and is thus adapted to apply the negative terminal of the source 23 to all but the omitted horizontal wire.

The selector switch 53 has its contacts connected to the other end terminals of the horizontal wires 17 through 21 and is ganged with the segment switch 70 so that the arm of the selector switch 53 makes contact with the horizontal wire omitted by the segment switch 70. The selector arm of the selector switch 53 is then coupled through the secondary winding of a first signal transformer 72 to the negative terminal of the source 23. The selector arm of the switch 53, and the segment switch 70 provide concurrent connection in the switching process with respect to the selected horizontal wire. In this manner, all of the horizontal wires are at all times connected with the holding source 23.

The signals, in this embodiment are directly applied to the matrix through a pair of signal transformers 72 and 73. The primary of the signal transformer 72 is coupled to the input terminals 35 for connection to a signal source. The secondary, as noted above, is coupled between the arm of the horizontal wire selector switch 53 and the negative terminal of source 23. It should be noted that the connections to the transformer 72 are reversed so that a positive pulse appearing between the input terminals 35 brings about a negative pulse upon the horizontal wire coupled to the selector arm 53.

The other portion of the signal circuit is coupled to the vertical wire selector switch 42 through signal transformer 73 having its primary coupled between input terminals 35, and its secondary inserted between the selector arm of switch 42 and the positive terminal of source 23. The contacts of the selector switch 42 are coupled through capacitors 47, 48, 49, 50 and 51 to vertical wires 12 through 16, respectively. Timely discharge of these capacitors is provided by discharge resistors 56, 57, 58, 59 and 60 which are coupled in shunt with capacitors 47, 48, 49, 50 and 51, respectively.

The windings of the signal transformer 73 are connected in normal polarity whereby positive pulses fed to the input terminals 35 apply positive pulses to the arm of the selector switch 42, thus elevating the potential of a selected vertical wire while the signal pulse as applied to the horizontal wire through transformer 72, is depressing the potential of the selected horizontal wire. In this manner, positive pulses cooperate to increase the potential at a selected element to cause firing and similarly negative going pulses cooperate to decrease the potential at a selected element to cause extinction.

In the embodiment shown in Figure 3, the synchronizing elements have been omitted, but may be similar to those of the first embodiment.

Figures 1 and 3 show three diverse ways of achieving electrical isolation between the individual wires of the matrix, and between the individual wires of the matrix and the source of holding potentials. These isolation measures, as explained above, permit the potentials of selected horizontal and vertical wires to change in accord with the signal voltage without adverse signal coupling to the non-selected wires or undue loading of the signal source by the holding source. These three methods include the use of series resistances (24—28) in each of the supply lines to the holding source, the use of series inductances (29—33), and the use of a disconnection switch (70) at a selected wire.

One may employ these methods interchangeably in many applications. In many cases the selection of the isolating impedances may advantageously take into account the difference in nature of the holding voltage and the signal voltage. When a simple D.-C. holding voltage is employed and relatively short duration signal pulses are supplied, inductances may well be used in both isolating applications and their magnitudes may be quite small. In the event a low frequency alternating current holding voltage is employed, and the signal voltage is of similar frequency content, then a disconnecting switch would provide a satisfactory type of isolation in both horizontal and vertical wires. In most applications, the use of resistive isolation in both vertical and horizontal wires is least satisfactory, since it reduces the number of elements which can be effectively used in a given matrix.

While particular embodiments of the invention have been shown and described, it should be understood that the invention is not limited thereto, and it is intended in the appended claims to claim all variations as fall in the true spirit of the present invention.

What I claim as new and desire to secure by Letters Patent of the United States is:

1. In combination, a visual display device comprising a matrix of gas discharge elements of the type exhibiting an N-shaped conduction characteristic having predetermined firing and extinction potentials defining successive positive, negative and positive resistance regions, each element including a pair of electrodes, means for altering the potential between the first and second electrodes of selected elements over a range greater than the difference between the firing and extinction potentials of said elements in accordance with an applied signal, and potential supply means for said elements having a low internal resistance for establishing an operating load line whose slope is small, arranged to intersect both positive resistance regions of said conduction characteristic, and having an average potential approximately mid-way between the firing and extinction potentials of said elements whereby each element remains in one of two conductive conditions unless the potential between the element electrodes is altered to a value beyond the range between said firing and extinction potentials to effect a change in condition of the element.

2. In combination, a visual display device comprising a matrix of gas discharge elements, each element including a pair of electrodes, means for supplying potentials to each pair of electrodes of said matrix at a voltage intermediate between the firing and extinction potentials of said discharge elements through a path of low impedance to said energizing potentials whereby each element remains in one of two conductive conditions unless the potential between the element electrodes is altered to a value beyond the range between said firing and extinction potentials to change the condition of the element, and means for momentarily altering the potential between the first and second electrodes of selected elements beyond the range between said firing and extinction potentials in the presence of a desired signal to effect a change in condition in said selected elements to accord with the information contained in said signal.

3. In combination, a visual display device comprising a matrix of gas discharge elements having first and second conductive conditions and having predetermined firing and extinction potentials defining points where said elements change from one conductive condition to a second conductive condition, each element including a first and second electrode, means for connecting said first electrodes together in a first plurality of groups, means for connecting said second electrodes together in a second plurality of groups, a first selector switch having its contacts connected respectively to each group in said first plurality of groups, a second selector switch having its contacts connected respectively to each group in said second plurality of groups, means for supplying to said selector switches a signal responsive voltage adapted to alter the potential at the respective groups to which the selectors are respectively connected in a sense to either jointly increase or jointly decrease the potential difference between elements common to both of said selected groups to alter the conductive condition of selected elements, a source of holding potentials having a voltage intermediate between the firing and extinction potentials of said elements, means coupling individual groups of said first plurality of groups in isolation from said selected group of said second plurality of groups to one terminal of said source, and means coupling individual groups of said second plurality of groups in isolation from said selected group of said second plurality of groups to the other terminal of said source.

4. The combination set forth in claim 3 wherein one of said coupling means comprises a plurality of resistors each individually coupling one group of one of said pluralities of groups of electrodes to one terminal of said source of holding potentials.

5. The combination set forth in claim 3 wherein one of said coupling means comprises a plurality of inductors each individually coupling one group of one of said pluralities of groups of electrodes to one terminal of said source of holding potentials.

6. The combination set forth in claim 3 wherein one of said coupling means comprises a first switch coupling all of the groups of one of said pluralities of groups of electrodes except for the selected group of said plurality of groups to one terminal of said source, and a second switch for separately coupling the excepted group to said one terminal of said source.

7. In combination, a visual display device comprising a matrix of gas discharge elements having first and second conductive conditions and having predetermined firing and extinction potentials defining points where said elements change from one conductive condition to a second conductive condition, each element including a first and second electrode, means for connecting said first electrodes together in a first plurality of groups, means for connecting said second electrodes together in a second plurality of groups, a first selector switch having its contacts connected respectively to each group in said first plurality of groups, a second selector switch having its contacts connected respectively to each group in said second plurality of groups, means for supplying to said selector switches a signal responsive voltage adapted to alter the potential at the respective groups to which the selectors are respectively connected in a sense to either jointly increase or jointly decrease the potential difference between elements common to both of said selected groups to alter the conductive condition of selected elements, a source of holding potentials having a voltage intermediate between the firing and extinction potentials of said elements, means for coupling individual groups of said first plurality of groups to one terminal of said source through individual impedances for electrical isolation of these groups with respect to said signal responsive voltages, and means for coupling the other terminal of said source to individual groups of said second plurality of groups through individual impedances for electrical isolation of these groups with respect to said signal responsive voltages.

8. In combination, a signal responsive visual display device comprising a matrix of gas discharge elements having first and second conductive conditions and having predetermined firing and extinction potentials defining points where said elements change from one conductive condition to a second conductive condition, each element including a first and second electrode, means for coupling said first electrodes together in a first plurality of groups, means for connecting said second electrodes together in a second plurality of groups, means for supplying potentials between the first and second electrodes of said elements at a voltage intermediate between the firing and extinction potentials of said elements, one terminal of said supply means being coupled to individual groups of said first plurality of groups through separate low valued isolating resistors, and the other terminal of said supply means being coupled to individual groups of said second plurality of groups through separate isolating inductances, and signal responsive means for momentarily altering the potential of both the first and second electrodes of selected elements to vary the potential difference between said selected pairs of electrodes beyond the range between said firing and extinction potentials in the presence of a desired signal to effect a change in condition of selected elements.

9. The combination set forth in claim 8 wherein the isolating resistors have a value such that the difference in voltage drop therein between a condition in which all elements in the group connected thereto are fired and a condition in which no elements in the group are fired is less than the voltage difference between the firing and extinction potential of said elements.

References Cited in the file of this patent

UNITED STATES PATENTS

| | | |
|---|---|---|
| 1,754,491 | Wald | Apr. 15, 1930 |
| 1,779,748 | Nicholson | Oct. 28, 1930 |
| 2,021,010 | Jenkins | Nov. 12, 1935 |
| 2,049,763 | DeForest | Aug. 4, 1936 |
| 2,083,292 | Cawley | June 8, 1937 |
| 2,201,066 | Toulon | May 14, 1940 |
| 2,558,019 | Toulon | June 26, 1951 |
| 2,749,480 | Ruderfer | June 5, 1956 |